United States Patent
Bello et al.

(10) Patent No.: US 9,660,447 B2
(45) Date of Patent: May 23, 2017

(54) CONNECTOR HAVING WIRELESS CONTROL CAPABILITIES

(71) Applicant: Ideal Industries, Inc., Sycamore, IL (US)

(72) Inventors: Nolan Bello, North Aurora, IL (US); Sushil N. Keswani, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 902 days.

(21) Appl. No.: 13/650,757

(22) Filed: Oct. 12, 2012

(65) Prior Publication Data

US 2014/0103742 A1   Apr. 17, 2014

(51) Int. Cl.
*H02J 3/00*   (2006.01)
*H02J 13/00*   (2006.01)
*H01H 9/54*   (2006.01)
*H05B 37/02*   (2006.01)

(52) U.S. Cl.
CPC ............... *H02J 3/00* (2013.01); *H01H 9/54* (2013.01); *H02J 13/0075* (2013.01); *H05B 37/0245* (2013.01); *H05B 37/0272* (2013.01); *Y02E 60/7853* (2013.01); *Y04S 40/126* (2013.01); *Y10T 307/944* (2015.04)

(58) Field of Classification Search
CPC ..... H02J 13/0075; H02J 3/00; Y02E 60/7853; Y04S 40/126
See application file for complete search history.

(56) References Cited

U.S. PATENT DOCUMENTS

| 4,355,309 A | 10/1982 | Hughey et al. |
| 4,686,380 A | 8/1987 | Angott |
| 4,797,599 A | 1/1989 | Ference et al. |

(Continued)

FOREIGN PATENT DOCUMENTS

| EP | 2503856 | 9/2012 |
| EP | 2793323 A1 | 10/2014 |

(Continued)

OTHER PUBLICATIONS

ISA/US, International Search Report and Written Opinion of PCT Application No. US2013/064303, received Apr. 28, 2014, 9 pages.

(Continued)

*Primary Examiner* — Jared Fureman
*Assistant Examiner* — Joel Barnett
(74) *Attorney, Agent, or Firm* — Greenberg Traurig, LLP

(57) ABSTRACT

A connector for connecting a source of AC power to a powered device includes a line-side interface arranged for releasably and electrically coupling the connector to the source of power, a load-side power interface arranged for electrically coupling the connector to the powered device, a load-side control interface for controlling the power supplied to the powered device, a controller electrically coupled to the line-side interface, the load-side power interface, and the load-side control interface and operable to control a bringing of power to the load-side power interface from the line-side interface and for bringing a control signal to the load-side control interface, and a receiver electrically coupled to the controller for receiving a first signal from a device external to the connector and for generating, in response thereto, a second signal for controlling operations of the controller.

19 Claims, 2 Drawing Sheets

(56) References Cited

U.S. PATENT DOCUMENTS

| | | |
|---|---|---|
| 5,146,153 A | 9/1992 | Luchaco et al. |
| 5,237,264 A | 8/1993 | Moseley et al. |
| 5,315,533 A | 5/1994 | Stich et al. |
| 5,598,039 A | 1/1997 | Weber |
| 5,982,103 A | 11/1999 | Mosebrook et al. |
| 6,040,987 A | 3/2000 | Kudo |
| 6,249,516 B1 | 6/2001 | Brownrigg et al. |
| 6,262,901 B1 | 7/2001 | Simopoulos |
| 6,803,728 B2 | 10/2004 | Balasubramaniam et al. |
| 6,990,394 B2 | 1/2006 | Pasternak |
| 7,045,968 B1 | 5/2006 | Bierman et al. |
| 7,103,511 B2 | 9/2006 | Petite |
| 7,307,542 B1 | 12/2007 | Chandler et al. |
| 7,355,523 B2 | 4/2008 | Sid |
| 7,623,042 B2 | 11/2009 | Huizenga |
| 7,653,010 B2 | 1/2010 | Ensor et al. |
| 7,679,222 B2 | 3/2010 | Patterson et al. |
| 7,741,974 B1 | 6/2010 | Kuo |
| 7,762,821 B2 | 7/2010 | Patterson et al. |
| 7,839,017 B2 | 11/2010 | Huizenga et al. |
| 7,859,398 B2 | 12/2010 | Davidson et al. |
| 7,865,252 B2 | 1/2011 | Clayton |
| 7,884,732 B2 | 2/2011 | Huizenga |
| 7,925,384 B2 | 4/2011 | Huizenga et al. |
| 7,964,989 B1 * | 6/2011 | Puschnigg ............ H01R 13/665  307/116 |
| 7,997,901 B2 | 8/2011 | Karmaker |
| 7,997,910 B2 | 8/2011 | Myers et al. |
| 8,062,042 B2 | 11/2011 | Patterson et al. |
| 8,199,010 B2 | 6/2012 | Sloan et al. |
| 8,228,184 B2 | 7/2012 | Blakeley et al. |
| 8,265,674 B2 | 9/2012 | Choong et al. |
| 8,275,471 B2 | 9/2012 | Huizenga et al. |
| 8,674,616 B2 | 3/2014 | Holman et al. |
| 2003/0006905 A1 | 1/2003 | Shieh et al. |
| 2004/0084972 A1 | 5/2004 | Weng |
| 2004/0201491 A1 | 10/2004 | Weng |
| 2007/0123075 A1 | 5/2007 | Insalaco et al. |
| 2007/0247086 A1 | 10/2007 | Chiu |
| 2008/0161073 A1 | 7/2008 | Park et al. |
| 2008/0195874 A1 | 8/2008 | Zhou |
| 2008/0211347 A1 | 9/2008 | Wright et al. |
| 2008/0316003 A1 * | 12/2008 | Barnett ............... H02J 13/0075  340/12.3 |
| 2009/0014625 A1 | 1/2009 | Bartol et al. |
| 2009/0017694 A1 | 1/2009 | Bethurum et al. |
| 2009/0248217 A1 * | 10/2009 | Verfuerth ........... H05B 37/0209  700/295 |
| 2010/0052576 A1 * | 3/2010 | Steiner ............... H05B 37/0227  315/361 |
| 2010/0118574 A1 | 5/2010 | Bourgeau |
| 2010/0141153 A1 * | 6/2010 | Recker ............... H05B 33/0803  315/149 |
| 2010/0148591 A1 | 6/2010 | Lim |
| 2011/0006616 A1 | 1/2011 | Hilgers |
| 2011/0043052 A1 | 2/2011 | Huizenga et al. |
| 2011/0121752 A1 * | 5/2011 | Newman, Jr. .......... H05B 39/04  315/291 |
| 2011/0175553 A1 | 7/2011 | Sampsell |
| 2011/0184577 A1 | 7/2011 | Ilyes |
| 2012/0013434 A1 | 1/2012 | Park et al. |
| 2012/0049639 A1 | 3/2012 | Besore et al. |
| 2012/0112654 A1 | 5/2012 | Choong et al. |
| 2012/0133217 A1 | 5/2012 | Lemire |
| 2013/0229067 A1 | 9/2013 | Didonato |

FOREIGN PATENT DOCUMENTS

| | | |
|---|---|---|
| WO | 2004107679 | 12/2004 |
| WO | 2011140097 | 11/2011 |

OTHER PUBLICATIONS

International Search Report and Written Opinion of PCT Application No. US2013/027739, received Apr. 26, 2013, 14 pages.

European Patent Office, extended European Search Report issued on EP patent application No. 13844985.5, dated Jun. 10, 2016, 7 pages.

* cited by examiner

CONNECTOR HAVING WIRELESS CONTROL CAPABILITIES

CROSS REFERENCE TO RELATED APPLICATION

This application is related to U.S. patent application Ser. No. 13/591,371 entitled "Connector Having Wireless Control Capabilities," filed Aug. 22, 2012, which is a nonprovisional application claiming the benefit of U.S. Provisional Application No. 61/606,129, filed on Mar. 2, 2012, the disclosures of which are each incorporated herein by reference in their entirety.

FIELD OF THE DISCLOSURE

The present description relates generally to a wireless smart connector and more particularly to a connector having wireless control capabilities.

BACKGROUND OF RELATED ART

The subject disclosure is generally related to electrical connectors and, more particularly, to an electrical connector having wireless control capabilities for use in connection with an alternating current (AC) power system.

Systems for bringing low-voltage direct current (DC) power to low-voltage DC powered devices, such as light fixtures, sensors, or the like, are known in the art. By way of example, U.S. Pat. No. 7,997,910, U.S. Pat. No. 8,062,042, U.S. Pat. No. 7,679,222, and U.S. Pat. No. 7,762,821 (which patents are incorporated herein by reference in their entirety) disclose various grid systems that support conductive materials that are electrically coupled to a low-voltage DC power source and which provide contact surfaces that are connectable to low-voltage DC powered devices. These patents also describe various types of connectors that provide a means for coupling a low-voltage DC powered device to the contact surfaces of the grid system.

In addition, systems and methods of providing an adaptor for bringing wireless communication to a wired sensor include the use of a sensor interface, such as described in U.S. Pat. No. 8,275,471, U.S. Pat. No. 7,839,017, U.S. Pat. No. 7,925,384, US Patent Publication No. 2011/0043052, and US Patent Publication No. 2011/0043052. In at least one example, the referenced publications describe a system and method for enabling wireless communication with a wired sensor. In this example, power is continuously supplied to an electrical load device under control of a separate wireless controller. The wireless controller includes information stored and/or detected to directly control the electric load device.

Sill further, U.S. Pat. No. 6,990,394 describes a control system for allowing remote control of a load. In the described example, a light fixture includes a lamp controller which controls the operation of a lamp by selectively coupling the power source to the lamp. The lamp controller selectively operates the lamp in response to signals received from a remote controller and a light switch, as well as from a motion sensor and a photo sensor.

While the described connectors, systems and methods generally work for their intended purpose, the following describes an improvement to the known connectors for use in such similarly constructed systems.

SUMMARY

Described hereinafter is an improved push-in type connector which, among other advantages, has the advantage of allowing for wireless control of and the bringing of power to an AC voltage fixture. The connector is well suited for both retrofit/rehabilitation installations as well as for new construction. While not intended to be limiting, the subject connectors may be used to couple an AC powered device to any suitable AC powered wireless control system, to any suitable AC power cables, and/or to other disconnection/connection points in an AC power system. The subject connectors may be provided with one or more mechanical terminal structures, such as for example, push-in type terminal connectors, to thereby allow the subject connectors to be easily and releasably attached thereto.

While the foregoing provides a general description of the subject connector, a better understanding of the objects, advantages, features, properties, and relationships of the subject connector will be obtained from the following detailed description and accompanying drawing which set forth an illustrative example and which is indicative of the various ways in which the principles of the invention may be employed.

BRIEF DESCRIPTION OF THE DRAWINGS

For a better understanding of the subject invention, reference may be had to the following drawings in which.

DETAILED DESCRIPTION

Figure 1:
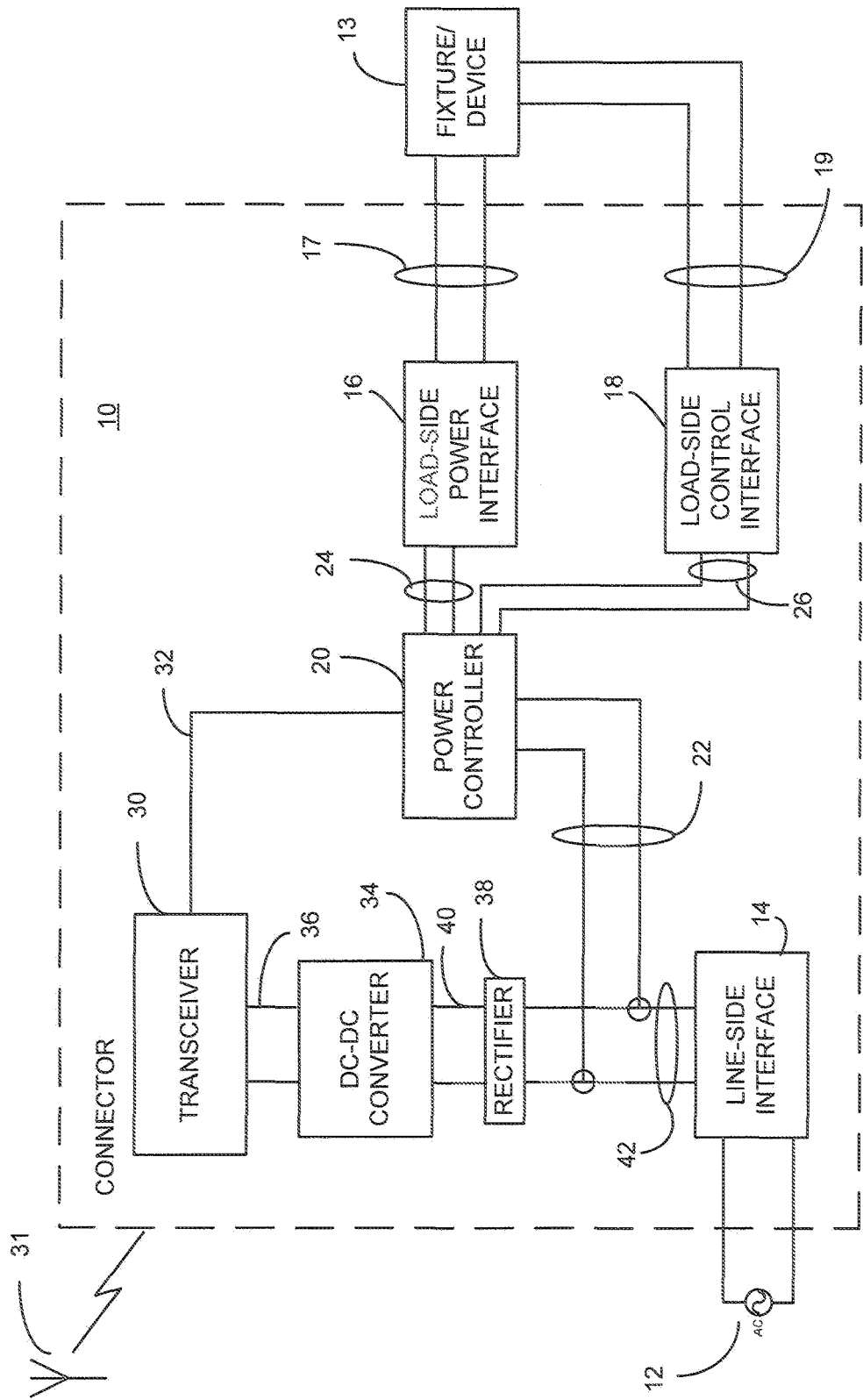
FIG. 1 illustrates a schematic diagram of exemplary components of a connector having wireless communication capabilities.

Turning now to the FIG. 1, a schematic diagram of an exemplary connector 10 for use in bringing power from a power source 12, such as an alternating current (AC) power source to a powered fixture or device 13, such as a light fixture, sensor, or the like, is illustrated.

For allowing the connector 10 to be coupled to the power source 12, the connector 10 includes a line-side interface 14 comprised of one or more electrical contacts arranged to allow engagement with corresponding electrical conductors or surfaces associated with the power source 12. The electrical contacts of the line-side interface 14 may be incorporated into a housing, such as for example a non-conductive housing, having mechanical structures as needed to allow the connector 10 to be releasably attached to a power grid system, power cables, and/or to other disconnection/connection points in a power system. While not limiting, the wireless connector 10 may also be attached to conductors, such as wires, associated with the source of AC power through use of insulation piercing type contacts (IPC type contacts), insulation displacing type contacts (IDC type contacts), push-in type contacts, crimp type contacts, weld type contacts, etc.

For allowing the connector 10 to be coupled to the powered device 13, the connector 10 includes a load-side power interface 16 and a load-side control interface 18 comprising one or more electrical contacts (which one or more electrical contacts may be incorporated into the same or a further housing having mechanical structures as needed)

adapted to be engaged with wires 17, 19, respectively, plugs, or the like, that are associated with the powered device 13. The example load-side power interface provides AC power to the device 13, while the example load-side control interface 19 provide a control signal, such as for example, a dim, flash, brighten, chase, turn on, turn off, etc. control signal.

While the load-side power interface 16 and the load-side control interface 18 are illustrated in the present example as separate components, it will be appreciated by one of ordinary skill in the art that the interfaces 16, 18 may be integrally and/or separately formed as desired. Additionally, each of the electrical contacts and/or wires 17, 19, may be otherwise combined and/or separated. Still further, without limitation, the electrical contacts of the load-side interface 16 and/or the load-side control interface 18 may be push-in type contacts, IDC type contacts, IPC type contacts, crimp type contacts, weld type contacts, etc.

To control the bringing of power from the line-side interface 14 to the load-side power interface 16, and accordingly to the device 13 coupled to the load-side interface 16, the connector 10 further includes a controller 20. As illustrated in FIG. 1, the example controller 20 is electrically coupled to the line-side interface 14 via an electrical connection 22 and is electrically coupled to the load-side interface 16 via an electrical connection 24. In addition, to provide control instructions and/or signals to the load-side control interface 18, the controller 20 is coupled to the load-side control interface 18 via an electrical connection 26. By way of example only, the controller 20 may comprise a semiconductor based electronic device such as an Opto-isolator, silicon-controlled rectifier (SCR), field-effect transistor (FET), transistor, microelectromechanical systems (MEMS) switch, and/or any other suitable controller. Furthermore, as previously noted, while the load-side power interface 16 and the load-side control interface 18 may be integrally or separately formed as desired, it will be appreciated by one of ordinary skill in the art that the controller 20 may also be integrally formed with one or more of the interfaces as desired.

In this example, the controller 20 is further coupled to a receiver (e.g., a wireless receiver) or transceiver 30, which, as described hereinafter, functions to provide a control signal to the controller 20 via an electrical connection 32. Power is provided to the wireless receiver or transceiver 30 by means of an optional DC-DC converter 34, which is electrically coupled to the wireless receiver or transceiver 30 via an electrical connection 36 and to the line-side interface 14 via a rectifier 38 having an electrical connection 40 to the DC-DC converter 34 and an electrical connection 42 to the line-side interface 14. The wireless receiver or transceiver 30 may also be directly coupled to the line-side interface 14 and/or the rectifier 38 as desired. It will also be understood that other means for providing power to the wireless receiver or transceiver 30 could also be employed, such as by providing power through use of a battery, through use of ambient radio frequency (RF) power harvesting, or the like. It will also be understood that the electrical connections between the various components illustrated in FIG. 1 may be traces formed on a printed circuit board (PCB), wires, or the like without limitation.

More particularly, for controlling the bringing of power to the load-side interface 16 and/or for controlling the bringing of control signals to the load-side control interface 18, the wireless receiver or transceiver 30 is adapted to receive and transmit a control signal (e.g., a DC control signal) to the controller 20 via the electrical connection 32 in response to the wireless receiver or transceiver 30 receiving a control signal from a remotely located device 31, e.g., a switch, control center, or the like. In one example, the remotely located device and the wireless receiver or transceiver 30 are adapted to communicate via use of wireless RF transmissions. The controller 20 is, in turn, adapted to respond to the control signal transmitted thereto via the electrical connection 32 to control the bringing of power to the load-side interface 16 from the line-side interface 14 via the electrical connections 22 and 24. Additionally, the controller 20 is adapted to respond to the control signal transmitted thereto via the electrical connection 32 to control the bringing of a control signal to the load-side control interface 18 via the electrical connection 26.

In this regard, the control signal provided to the controller 20 by the wireless receiver or transceiver 30 is used to turn on or turn off the power connection between the load-side power interface 16 and the line-side interface 14. Furthermore, the control signal provided to the controller 20 by the wireless receiver or transceiver 30 may also be used to provide a controlling signal to the load-side control interface 18 to limit and/or otherwise modify or control the amount of power that is provided to the device 13 e.g., to provide for a dimming effect. Specifically, in at least one example, the load-side control interface may reduce (e.g., dim) the output AC voltage by chopping the AC output for typical incandescent light. Still further, the load-side control interface may provide an analog (e.g., 0 to 10) volt variable output to dim fluorescent lights.

It will also be appreciated that, in the case when a transceiver 30 is utilized, the connector 10 may allow for state data associated with the controller 20, and accordingly the device 13, and/or other data to be communicated to other remotely located devices as needed. While not illustrated, the connector 10 may additionally include a mechanism or other means for allowing a user to set (or for pre-setting at a time of manufacture) an address to thereby allow communications to the connector 10, via the receiver or transceiver 30, to be specifically targeted thereto—which would be particularly useful in an instance where multiple connectors are intended to be used in a confined area.

Figure 2:
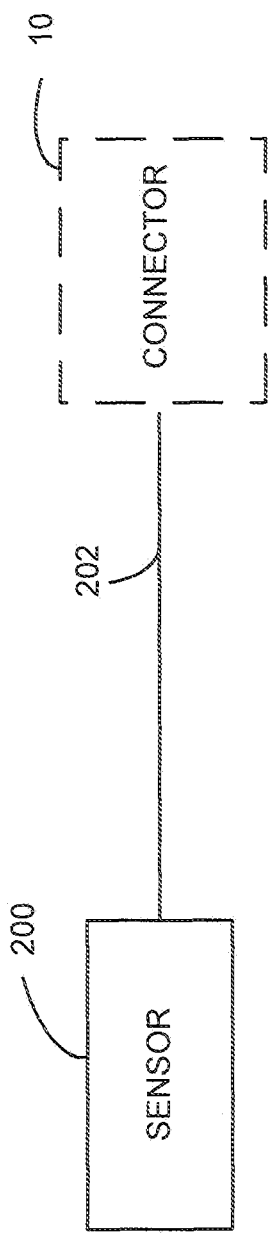
FIG. 2 illustrates a schematic diagram of exemplary components of the connector having wireless communication capabilities including an environmental sensor directly coupled to the connector.
Figure 3:
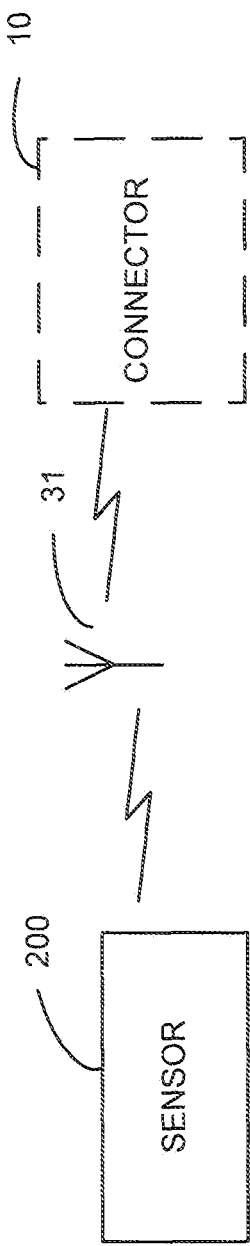
FIG. 3 illustrates a schematic diagram of exemplary components of the connector having wireless communication capabilities including an environmental sensor indirectly coupled to the connector.

Turning now to FIGS. 2 and 3, for providing the connector 10 with environmental and/or status information, the connector 10 may be directly coupled to a sensor 200 via a communication link, such as for example, a wire 202 (FIG. 2). It will be appreciated by one of ordinary skill in the art, however, that the communication link may be wireless, wired, and/or other suitable link as desired. For example, the sensor 200 may be capable of communicating directly with the transceiver 30 or may communicate directly with the controller 20. Still further, as illustrated in FIG. 3, the sensor 200 may be adapted to communicate directly with the remotely located device 31, which in turn communicates with the connector 10 as described hereinabove.

In the example of FIGS. 2 and 3, the sensor 200 may be adapted to sense an environmental condition, such as a temperature, motion, light level, time of day, etc., and communicate the sensed condition to the connector 10 (either directly or indirectly as shown) for influencing the ultimate performance of the device 13. For example, the sensor 200 may detect an ambient light of the room in which the sensor 200 is installed and relay that the relevant information to the connector 10 for influencing the load-side power interface 16 and/or the load-side control interface 18, which in turn influences the performance state of the device 13. In this way, the connector 10 may be "smart" in that the connector 10 is able to influence the performance of the fixture device to which it is connected in response to an external stimuli.

While specific examples of the present disclosure have been described in detail, it will be appreciated by those of ordinary skill in the art that various modifications and alternatives to those details could be developed in light of the overall teachings of this disclosure. It will therefore be appreciated that features described are not to be limited to any particular embodiment but may be freely used across embodiments where applicable. Additionally, it will be appreciated that the size, shape, arrangement, and/or number of components illustrated and described can be changed as necessary to meet a given need. Accordingly, the particular arrangements disclosed are meant to be illustrative only and not limiting as to the scope of the invention which is to be given the full breadth of the appended claims and any equivalents thereof.

What is claimed is:

1. A system, comprising:
a powered device having a powered device controller; and
a connector for connecting a source of alternating current (AC) power to the powered device, wherein the powered device is located external to the connector and wherein the connector further comprises:
a line-side interface having one or more electrical contacts arranged for electrically coupling the connector to a one or more corresponding electrical conductors associated with the source of AC power;
a load-side power interface having one or more electrical contacts arranged for electrically coupling the connector to a one or more corresponding power receiving electrical conductors associated with the powered device;
a load-side control interface separate and distinct from the load-side power interface having one or more electrical contacts arranged for electrically coupling the connector to a one or more corresponding electrical conductors associated with the powered device controller of the powered device;
a controller electrically coupled to the line-side interface, the load-side power interface, and the load-side control interface, wherein the controller causes the load-side power interface to be selectively coupled to the line-side interface to thereby control the providing of AC power from the source of AC power to the powered device via the one or more corresponding power receiving electrical conductors associated with the powered device and the one or more electrical contacts of the load-side power interface and causes a control signal to be provided to the powered device via the one or more corresponding electrical conductors associated with the powered device controller of the powered device and the one or more electrical contacts of the load-side control interface; and
a receiver electrically coupled to the controller for receiving a first signal from a controlling device external to the connector and for generating, in response thereto, a second signal for provision to the controller whereby the controller causes the load-side power interface to be selectively coupled to the line-side interface and causes the control signal to be provided to the load-side control interface as a function of the second signal provided thereto by the receiver.

2. The system as recited in claim 1, wherein the one or more electrical contacts of the line-side interface are arranged for releasably and electrically coupling the connector to the one or more corresponding electrical conductors associated with the source of AC power.

3. The system as recited in claim 1, wherein the one or more electrical contacts of at least one of the load-side power interface and the load-side control interface comprises at least one of a push-in type contact, an IDC type contact, an IPC type contact, a crimp type contact, and a weld type contact for engaging a corresponding one or more wires associated with the powered device.

4. The system as recited in claim 1, wherein the control signal caused to be provided to the load-side control interface by the controller comprises an electrical signal for controlling an on/off power function of the powered device controller of the powered device.

5. The system as recited in claim 1, wherein the control signal caused to be provided to the load-side controller interface by the controller comprises an electrical signal for controlling a dimming power function of the powered device controller of the powered device.

6. The system as recited in claim 1, wherein the controller comprises at least one of an Opto-isolator, an silicon-controlled rectifier (SCR), a field-effect transistor (FET), transistor, and a microelectromechanical systems (MEMS) switch.

7. The system as recited in claim 1, further comprising a rectifier electrically coupled to the receiver and the line-side interface for providing power to the receiver.

8. The system as recited in claim 7, further comprising a DC-DC converter electrically coupled between the rectifier and the receiver.

9. The system as recited in claim 1, wherein the receiver is directly, electrically coupled to the line-side interface which provides power to the receiver.

10. The system as recited in claim 1, further comprising a battery for providing power to the receiver.

11. The system as recited in claim 1, wherein the receiver is an RF receiver.

12. The system as recited in claim 1, wherein the receiver comprises a transceiver.

13. The system as recited in claim 12, wherein the transceiver is an RF transceiver.

14. The system as recited in claim 1, wherein the receiver is provided with an address.

15. The system as recited in claim 14, comprising an address setting device associated with the receiver.

16. The system as recited in claim 1, wherein at least two of the load-side power interface, the load-side control interface, and the controller are integrally formed.

17. The system as recited in claim 1, further comprising a sensor external to the connector and communicatively coupled to the connector for providing data indicative of a state of the sensor to the controller.

18. The system as recited in claim 17, wherein the remote sensor communicates directly with the connector.

19. The system as recited in claim 17, wherein the remote sensor communicates with an intermediate device, which in turn relays the data indicative of a state associated with the sensor to the connector.

* * * * *